(12) United States Patent  (10) Patent No.: US 8,811,982 B2
Sato et al.  (45) Date of Patent: Aug. 19, 2014

(54) COMMUNICATING OPERATOR INFORMATION TO AN EXTERNAL DEVICE

(75) Inventors: Hiroto Sato, Tokyo (JP); Toshiya Tamura, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 987 days.

(21) Appl. No.: 12/487,337

(22) Filed: Jun. 18, 2009

(65) Prior Publication Data

US 2010/0062763 A1  Mar. 11, 2010

(30) Foreign Application Priority Data

Aug. 7, 2008 (JP) .................................. 2008-204805

(51) Int. Cl.
*H04W 4/00* (2009.01)
*H04W 8/18* (2009.01)
*H04W 4/02* (2009.01)
*H04W 88/06* (2009.01)
*H04W 8/08* (2009.01)

(52) U.S. Cl.
CPC .............. *H04W 8/183* (2013.01); *H04W 4/02* (2013.01); *H04W 88/06* (2013.01); *H04W 8/08* (2013.01)

USPC .................... 455/432.3; 455/41.2; 455/569.1

(58) Field of Classification Search
None
See application file for complete search history.

(56) References Cited

U.S. PATENT DOCUMENTS

2008/0295017 A1* 11/2008 Tseng et al. .................. 715/777
2009/0215491 A1* 8/2009 Hou et al. .................... 455/558

OTHER PUBLICATIONS

Bluetooth Specification, Hands-Free Profile 1.5, Nov. 25, 2005, p. 24.*
"Hands-Free Profile (HFP) 1.5"; Bluetooth Specification; Nov. 25, 2005; 3 pages.

* cited by examiner

*Primary Examiner* — German J Viana Di Prisco
(74) *Attorney, Agent, or Firm* — Maschoff Brennan

(57) ABSTRACT

A controller of a mobile communication apparatus, such as a cellular phone, that detects operator information based on a radio signal transmitted from a base station and checks whether the operator information has changed while maintaining the same roaming status information. When the controller detects that the operator information changed, the controller transmits one of the same roaming status information and service status information to an external device which is connected via a short-range communication link.

18 Claims, 8 Drawing Sheets ary Patent Application No. 2008-204805, filed Aug. 7, 2008, the entire contents of which are incorporated herein by reference.

COMMUNICATING OPERATOR INFORMATION TO AN EXTERNAL DEVICE

CROSS-REFERENCE TO RELATED APPLICATIONS

This application is based upon and claims the benefit of priority from Japanese Patent Application No. 2008-204805, filed Aug. 7, 2008, the entire contents of which are incorporated herein by reference.

BACKGROUND OF THE INVENTION

1. Field of the Invention

The present invention relates to a mobile communication apparatus which precisely controls status information of the mobile communication apparatus displayed on an external device connected via a short-range communication link.

2. Description of the Related Art

A short-range wireless communication technique called Bluetooth® is well-known. By utilizing this short-range wireless communication technique, audio data can be transmitted from a mobile communication terminal, such as a cellular phone or a portable music player, to an external device, such as a headset without using an audio cable.

In Bluetooth®, "Advanced Audio Distribution Profile (A2DP)" and "Generic Audio/Video Distribution Profile (GAVDP)" are provided to transmit audio data in real time between two devices over a Bluetooth® link.

A "Hands-Free Profile (HFP)" is also provided for receiving incoming calls and making outgoing calls using the external device connected to the mobile communication terminal via the Bluetooth® link. The HFP is the standard profile used to control processes relating to incoming calls and outgoing calls executed by an external device such as a headset or a car-mounted device that is connected to the cellular phone via the Bluetooth® link.

Further, roaming service can be provided between telecommunication carriers, where some cellular phones can connect to a base station corresponding to a service area provided by a telecommunication carrier other than the telecommunication carrier to which the cellular phones belongs. However, this roaming service is not limited to the service between different domestic carriers. As a result, cellular phones can connect to base stations belonging to a telecommunication carrier in foreign countries. This international service is called international roaming.

Moreover, the HFP of the Bluetooth® standard includes a roaming status notification function, an operator's name finding function, a service status notification function, a status finding function and so on. In the roaming status notification function, a Roam-indicator identifying a roaming status is transmitted from the cellular phone to the external device with each change in the roaming status. For example, if the cellular phone is in a home area, the Roam-indicator indicates "0" and if the cellular phone is in a roaming area the Roam-indicator indicates "1".

In the operator's name finding function, the cellular phone, responding to a request from the external device, transmits the operator's name to the external device. The operator's name corresponds to a name of the telecommunication carrier to which the cellular phone is currently connecting. In the service status notification function, a Service-indicator identifying whether a service is available or not is transmitted from the cellular phone to the external device with each change between no service and the presence of service. For example, if the cellular phone resides in a service area, the Service-indicator indicates "0", and, if the cellular phone resides outside of the service area, the Service-indicator indicates "1". In the status finding function, the cellular phone, responding to the external device, transmits the Roam-indicator, the Service-indicator, a Call-indicator, identifying if a call is active or not, and a Call-held indicator, identifying whether a call is held or not, to the external device.

However, according to the HFP, the roaming status indicator is not transmitted from the cellular phone to the external device when a user moves between roaming areas, For example if the user moves from Germany to France, when his/her cellular phone has a home area of Japan, the roaming status indicator is not transmitted. Thus is the case because both Germany and France are roaming areas for the cellular phone. Accordingly, an operator's name on a display of the cellular phone is not consistent with an actual carrier to which the cellular phone is connecting.

Also, if the cellular phone is located outside of the service area, according to the Bluetooth® standard, the cellular phone transmits the last roaming status and operator's name obtained just before going into no service.

BRIEF SUMMARY OF THE INVENTION

It is an object of the present invention to provide a mobile communication apparatus which enables an external device to display present status information precisely.

A communication apparatus includes: a first radio interface configured to communicate with a base station; a second radio interface configured to communicate with an external device via a short-range wireless link; a memory configured to store roaming status information, service status information, and operator information; and a controller configured to control the mobile communication apparatus, wherein, the controller obtains operator information based on a radio signal from the base station, compares the obtained operator information with the stored operator information in the memory, and transmits one of the roaming status information and the service status information in the memory to the external device when it is detected that the obtained operator information has changed.

BRIEF DESCRIPTION OF THE SEVERAL VIEWS OF THE DRAWING

The accompanying drawings, which are incorporated in and constitute a part of the specification, illustrate exemplary embodiments of the invention, and together with the general description given above and the detailed description of the exemplary embodiments given below, serve to explain the principles of the invention.

DETAILED DESCRIPTION OF THE INVENTION

Exemplary embodiments of the present invention will be described hereinafter with reference to the accompanying drawings.

Figure 1:
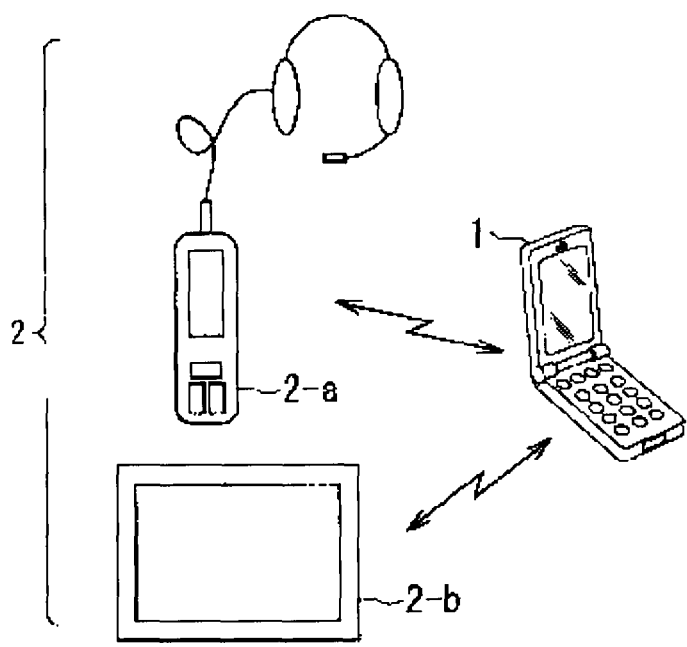
FIG. 1 is a block diagram showing an exemplary system composition.

FIG. 1 is a block diagram showing a system composition according to one embodiment of the invention. As shown in FIG. 1, an external device 2 such as a headset 2-*a* or a car-mounted device 2-*b* are provided adjacent to a cellular phone 1. The external device 2 can reproduce audio data transmitted from the cellular phone 1 via a short-range wireless communication link such as a Bluetooth® link in real time, and can make outgoing calls and receive incoming calls via the cellular phone 1 when in a hands-free mode, for example. Also, the external device 2 has a remote control function enabling the external device 2 to control the cellular phone 1 via the short-range wireless communication link and a display unit for displaying a plurality of information.

Figure 2:
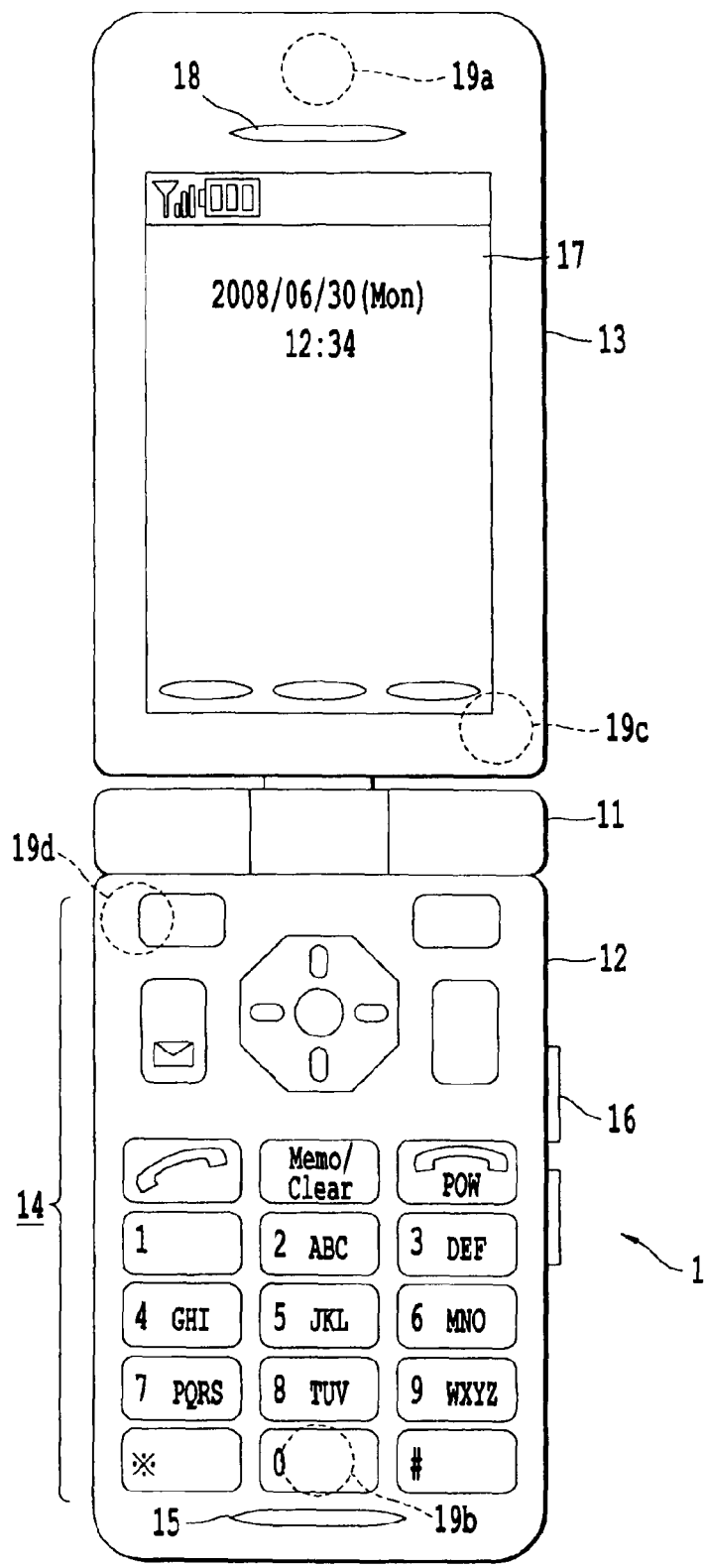
FIG. 2 shows an exemplary appearance of a cellular phone.

FIG. 2 shows an exemplary arrangement of a cellular phone 1. As shown in FIG. 2, the cellular phone 1 is composed of a first housing 12 and a second housing 13, and both housings are rotatably connected via a hinge unit 11. An antenna is placed inside of the cellular phone 1, and the cellular phone 1 makes a wireless communication with a base station via the antenna.

On a front surface of the first housing 12, there is arranged an operation key unit 14 composed of digit keys each assigned 0 through 9 and so on, a call key, a redial key, an end/power key, a clear key, and a menu key. Various instructions can be inputted via the operation key unit 14.

Also, the operation key unit 14 includes an arrow key and an enter-key at an upper portion of the first housing 12. The arrow key allows for inputting in four directions, and a cursor displayed on a display unit 17 is moved from side to side and up and down by manipulating the arrow key. For example, the arrow key is used to scroll a telephone directory, a content of an email, and web information displayed on the display unit 17.

The enter-key is used to select functions. For example, if, by manipulating the arrow key, an intended option is focused in a menu or an intended telephone number is focused in a directory list displayed on the display unit 17, a user can make an outgoing call simply by pressing the enter-key.

Furthermore, there is a mail-key to the left side of the arrow key and a browsing-key to the right side of the arrow key. A mail application is run if the mail-key is depressed and a web browsing application is run if the browsing-key is depressed.

There is a microphone 15 below the operation key unit 14 on the first housing 12, and speech communication is captured by the microphone 15. Also, side-keys 16 for manipulating the cellular phone 1 are installed on the side surface of the cellular phone 1.

A battery is inserted into a battery compartment on a back side of the cellular phone 1, and electric power is supplied to circuits from the battery when the cellular phone 1 is turned on by pressing the end/power key of the operation key unit 14.

On the other hand, the display unit 17 is located on a front surface of the second housing 13 and a reception condition, a remaining battery level, a content of email, a browsed internet page, a picture captured by a camera unit 20 and so on, are displayed on the display unit 17.

There is a receiver 18 above the display unit 17 and a voice from an intended party is outputted from the receiver 18. Also, there is a speaker 50 in the cellular phone 1.

Furthermore, inside of the first and second housings 12 and 13, there are magnetic sensors 19*a*, 19*b*, 19*c*, and 19*d* which detect whether the cellular phone 1 is in an opened state or in a closed state.

Figure 3:
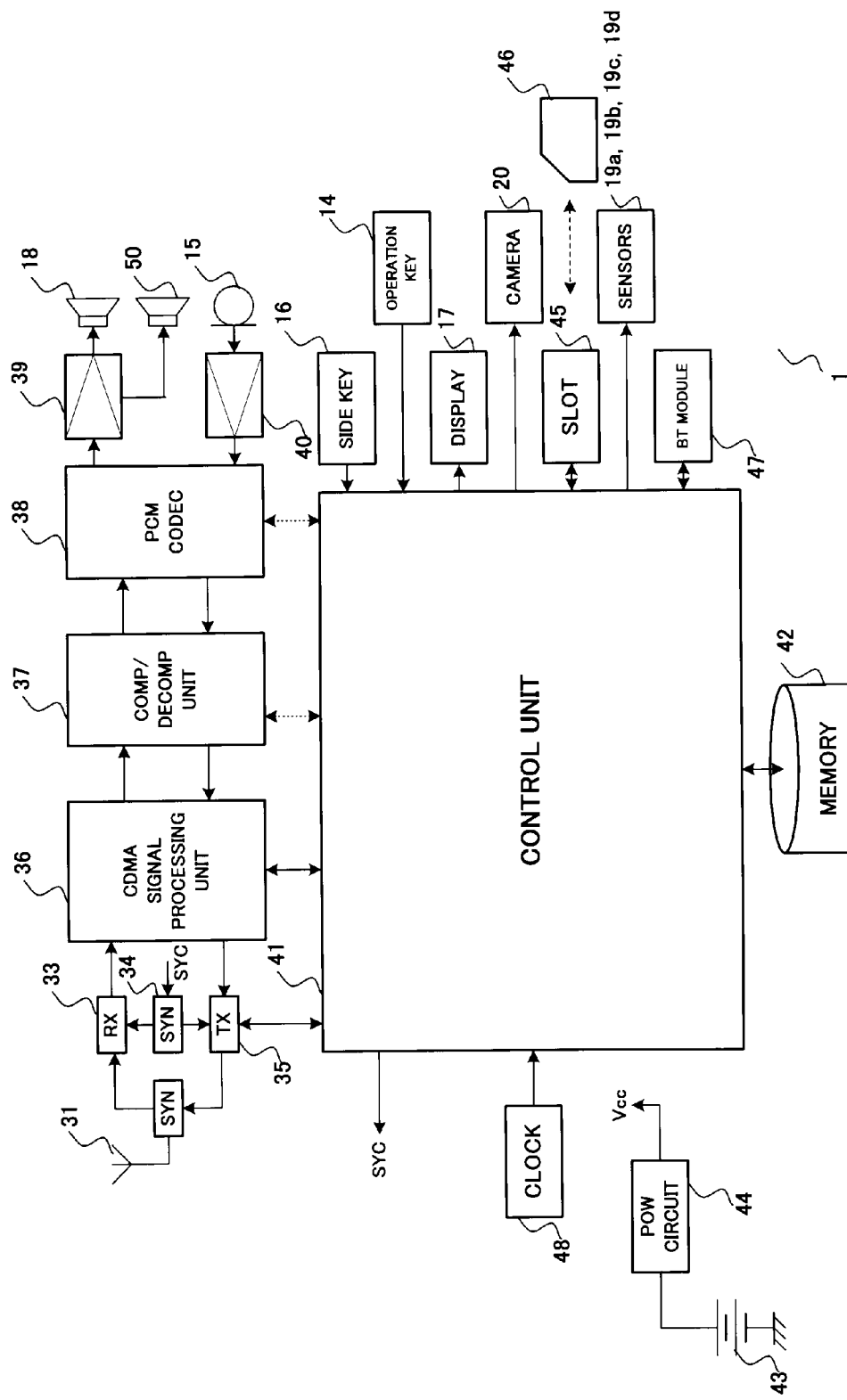
FIG. 3 is a block diagram of the cellular phone.

FIG. 3 shows an inside constitution of the cellular phone 1. A radio signal from a base station is received by an antenna 31. Subsequently, the radio signal is transferred to a reception circuit (RX) 33 via a duplexer (DUP) 32. The RX 33 downconverts the radio signal to an intermediate frequency signal by mixing with a local frequency signal outputted from a synthesizer (SYN) 34. Then, the RX 33 orthogonally demodulates the intermediate frequency signal and outputs a baseband signal. The local frequency signal outputted from the SYN 34 is controlled by a control signal SYC outputted from a control unit 41.

The baseband signal outputted from the RX 33 is inputted into a CDMA processor 36. The CDMA processor 36 despreads the baseband signal with a spreading code and generates packet data. The packet data is inputted into a data processor 37.

The data processor 37 is composed of a multiplexer/demultiplexer (MPX/DMPX) 37*a*, video codec 37*b*, and audio codec 37*c*. The packet data from the CDMA processor 36 is processed by the DMPX 37*a* and reconstructed to coded video data, coded audio data, message data, such as an email data, and control data. If the reconstructed data is coded audio data, the audio codec 37*c* decodes the coded audio data according to an audio coding standard such as AAC (Advanced Audio Codec) and generates digital audio data. The digital audio data may be speech data received from an intended party or audio data contained in movie content, for example. If the reconstructed data is coded video data, the video codec 37*b* decodes the coded video data according to a video coding standard such as H.264 and generates digital video data. For example, the digital video data may be video data contained in the movie content. If the movie content is not reproduced in real time, the packet data is stored in memory unit 42. In this case, the packet data is transferred from the CDMA processor 36 to the control unit 41.

The digital audio signal outputted from the data processor 37 is inputted into a PCM codec 38. The PCM codec 38 converts the digital audio signal into an analog audio signal using a Pulse Code Modulation method. The analog audio signal is outputted from the receiver 18 after being amplified by an amplifier 39.

The digital video data generated by the data processor 37 is input into the control unit 41. When the control unit 41 receives the digital video data, the control unit 41 processes the digital video data so that the digital video data is displayed on the display unit 17 via a video RAM (VRAM). The control unit 41 also processes a digital video data, captured by a camera unit 20, such as a CCD camera, and displays the digital video data on the display unit 17 via the video RAM.

In addition, if the reconstructed data from the packet data is message data, the data processor 37 transfers the message data to the control unit 41. The control unit 41 stores the message data from the data processor 37 in the memory unit 42. Subsequently, the control unit 41, in response to an instruction input from the operation keys 14, displays the message data, stored in the memory unit 42, on the display unit 17.

In speech communication the user's voice is captured by the microphone 15 and analog audio data is generated. The analog audio data is amplified to a given level by an amplifier 40 and inputted into the PCM codec 38. Thus, the analog audio data outputted from the amplifier 40 is digitized into a digital audio data by the PCM codec 38 and inputted into the data processor 37.

Video data outputted from the camera unit 20 is digitized by the control unit 41 and the digital video data is inputted into the data processor 37. Further, a message data generated by the control unit 41 is also inputted into the data processor 37.

The audio codec 37*c* of the data processor 37 encodes the digital audio data according to an audio coding standard, thus the coded audio data is generated. In addition, the video codec 37b of the data processor 37 encodes the digital video data inputted from the control unit 41 according to a video coding standard, thus the coded video data is generated. Thereafter, the MPX/DMPX 37a multiplexes the coded audio and video data, and generates the packet data. The packet data is inputted into the CDMA processor 36. Similarly, if message data is received from the control unit 41, the MPX/DMPX 37a packetizes the message data into packet data.

The CDMA processor 36 spreads the packet data outputted from the data processor 37 with a spreading code which is assigned to a transmission channel and outputs a spread signal to transmission circuit (TX) 35. The TX modulates the spread signal according to a digital modulation method such as QPSK (Quadrature Phase Shift Keying) and thereafter up-converts the modulated spread signal by mixing with a local frequency signal generated by the SYN 34. Then, a radio signal is generated by the TX 35. After the radio signal is amplified into a given level by the TX 35, the radio signal is transmitted to the base station via the DUP 32 and the antenna 31.

The cellular phone 1 is equipped with a memory interface 45 to which a memory card 46 is connectable. The memory card 46 may be a flash memory card represented by a NAND-type flash memory card or a NOR-type flash memory card. The control unit 41 reads out and writes the video data, the audio data, music data, and so on, from and to the memory card 46 via the memory interface 45.

Furthermore, the cellular phone 1 is equipped with a Bluetooth® module (hereinafter "BT module") 47 so as to communicate with an external device such as the headset 2-a or the car-mounted device 2-b via the Bluetooth® link. However, the present embodiment is not limited to only the Bluetooth® link established between a cellular phone 1 and an external device, other short-range wireless communication methods such as the IrDA and so on can also be used in place of the Bluetooth® link.

The control unit 41 may be composed of a CPU (Central Processing Unit), a ROM (Read Only Memory), a RAM (Random Access Memory), and so on. The CPU executes a program stored in the ROM and an application program loaded into the RAM from the memory unit 42, and controls a plurality of circuits and units so that the control unit 41 controls overall the cellular phone 1.

For example, an operator's information, such as a country code, an operator's code, and a home operator's name, to which the cellular phone 1 belongs, the Service-indicator, the Roaming-indicator, and the operator's name, to which the cellular phone 1 is connecting, are stored in the RAM. The home operator's information may include a home operator's code and a corresponding home operator's name, other operator's codes and corresponding operator's names, and country codes and corresponding country names.

Also, the control unit 41 of the cellular phone 1 checks whether the cellular phone 1 resides in the communication area, and whether the cellular phone 1 resides in a home area or a roaming area.

When exchanging data between the cellular phone 1 and the external device 2, the control unit 41 controls the BT module 47 so that the BT module 47 communicates with the external device 2 via the Bluetooth® link. Under the control of the control unit 41, a Bluetooth® link is established by the BT module 47 where the communication executed according to the A2DP, the HFP, or AVRCP (Audio/Video Remote Control Profile) is performed using a communication protocol such as AVDTP (Audio Video Distribution Transport Protocol), AVCTP (Audio Video Control Transport Protocol), or RFCOMM (RS232 Serial Cable Emulation Protocol).

As described earlier, the roaming status notification function, the operator's name finding function, the service status notification function, and the status finding function are defined in the HFP.

The memory unit 42 is composed of a rewritable nonvolatile flash memory or a HDD (Hard Disk Drive) and so on, and stores application programs and data to be used by the control unit 41.

A power circuit 44 generates a given voltage Vcc and supplies the given voltage Vcc to a plurality of circuits and units.

The cellular phone 1 is equipped with a clock circuit 48 for providing the control unit 41 and the circuits and so on with clock information.

Hereinafter, an explanation relating to how the external device 2 obtains an accurate operator's name even when the cellular phone moves from one service area to a different service area, will be provided.

Figure 4:
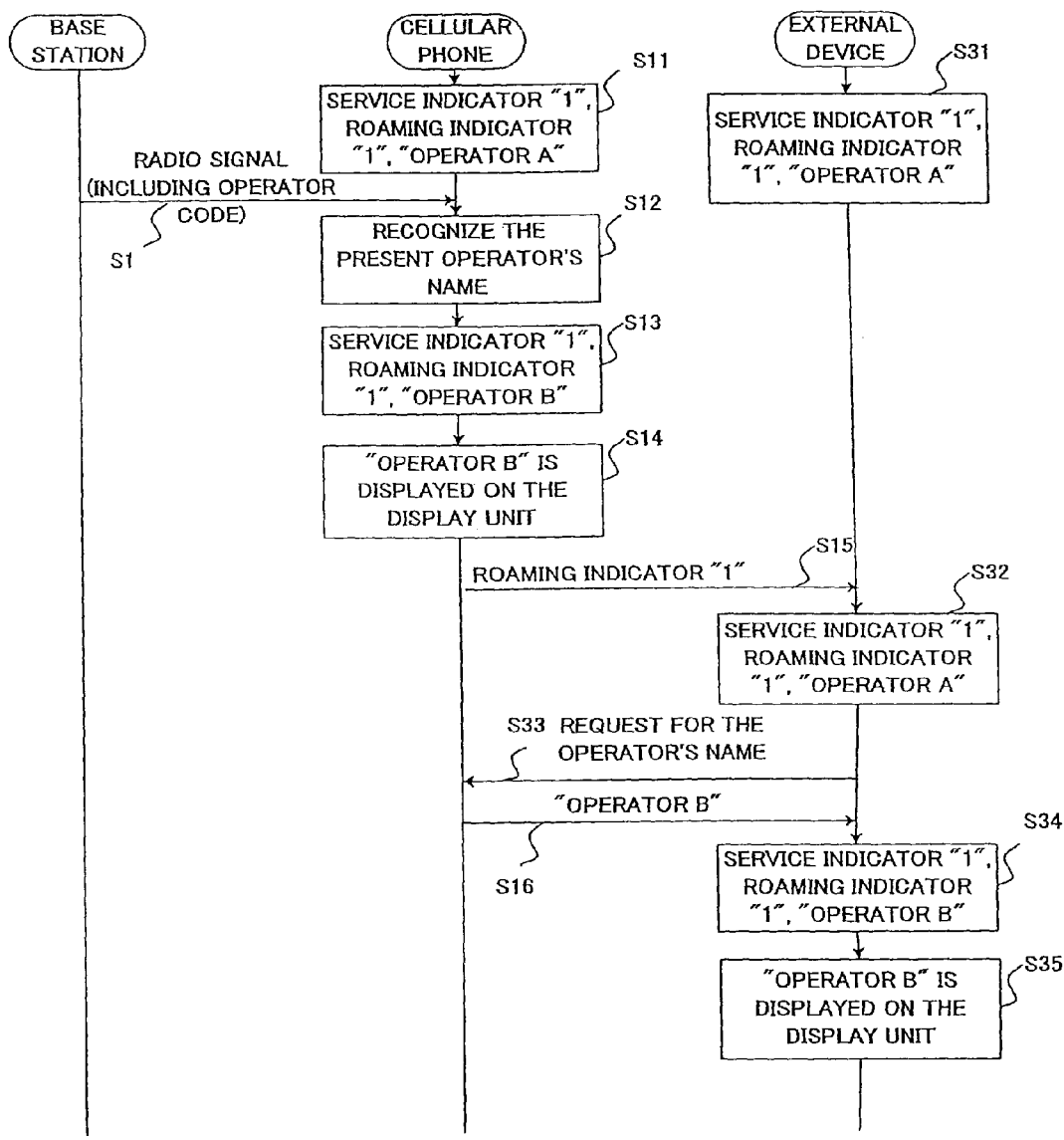
FIG. 4 is a sequence chart for explaining a first case of obtaining an operator's name.

FIG. 4 shows the operator's name obtaining process executed between the cellular phone 1, the external device 2, and a base station in a cellular phone network. In this case, it is assumed that the operator's name has changed from "OPERATOR A" to "OPERATOR B" with movement of the cellular phone 1 from Germany to France. Namely, when the cellular phone 1 resides in Germany, both the cellular phone 1 and the external device 2 register that the Service-indicator is "1", the Roaming-indicator is "1", and the operator's name is "OPERATOR A" (Steps S11 and S31). The operator's name maybe represented by an operator code.

In step S1, the cellular phone 1 moves from Germany to France and the operator's name contained in the radio signal from the base station is changed from the "OPERATOR A" to the "OPERATOR B". The control unit 41 obtains the new operator's name by comparing an operator's code contained in the radio signal with an operator's codes stored in the RAM in the control unit 41. Thereafter, the control unit 41 detects that the operator's name has changed by comparing the obtained operator's name with the operator's name in the RAM.

Consequently, the cellular phone 1 recognizes that the present operator's name is the "OPERATOR B" in step S12. Then, the cellular phone 1 registers that the Service-indicator is "1", the Roaming-indicator is "1", and the operator's name is "OPERATOR B", the present operator's name being stored in a present operator's name area in the RAM in step S13. Thereafter, under the control of the control unit 41, the present operator's name is displayed on the display unit 17 of the cellular phone 1 in step S14.

In step S15, the control unit 41 of the cellular phone 1 notifies the external device 2 of the Roaming-indicator indicating "1" via the BT module 47 even though the Roaming-indicator has not changed, since the operator's name has changed from "OPERATOR A" to "OPERATOR B".

When the external device 2 receives a Roaming-indicator indicating "1" from the cellular phone 1, the external device 2 again registers that the Service-indicator is "1", the Roaming-indicator is "1", and the operator's name is "OPERATOR A" in step S32. In this case, the external device 2 does not discard the notified Roaming-indicator, the value of the Roaming-indicator remaining "1", and transmits a request for the operator's name to the cellular phone 1 via BT module in the external device, based on the reception of the Roaming-indicator, in step S33.

When the cellular phone 1 receives the request from the external device 2 via the BT module 47, the control unit 41 reads out the operator's name, "OPERATOR B", from the RAM, and, in response to the request, sends the operator's name, "OPERATOR B", to the external device 2 via the BT module 47, in step S16. When the external device 2 receives the operator's name, "OPERATOR B", from the cellular phone 1 via the BT module of the external device 2, the external device 2 registers that the Service-indicator is "1", the Roaming indicator is "1", and the operator's name is "OPERATOR B" in step S34. Then, the "OPERATOR B" is displayed on a display unit of the external device 2 in step S35.

Thus, as described above, even if the operator's name is changed from "OPERATOR A" to "OPERATOR B", without changing the Roaming-indicator, due to the movement of the cellular phone 1 from Germany to France, the cellular phone 1 is able to provide the Roaming-indicator to the external device 2 and the same operator's name can be displayed on both the display unit 17 of the cellular phone 1 and the display unit of the external device 2.

In the illustration shown in FIG. 4, it is assumed that the cellular phone 1 moves from Germany to France. However, the invention is not limited to the situation described in the above example. This invention may apply to any case in which the cellular phone 1 does not recognize a change of roaming status even when the operator's name is changed. This may also happen when the cellular phone 1 moves from one area to another in a domestic area.

In addition, as is described above, the external device 2 transmits the request for the operator's name to the cellular phone 1 when the external device 2 receives the Roaming-indicator, however, the external device 2 may also transmit the request when the external device 2 receives the Service-indicator or both the Roaming-indicator and the Service-indicator.

Furthermore, in case that the operator's name is changed with the Roaming-indicator remaining "1", the cellular phone 1 may first transmit the Roaming-indicator indicating "0", and then transmit the Roaming-indicator indicating "1". Hereinafter, detailed explanation regarding such a case will be provided.

Figure 5:
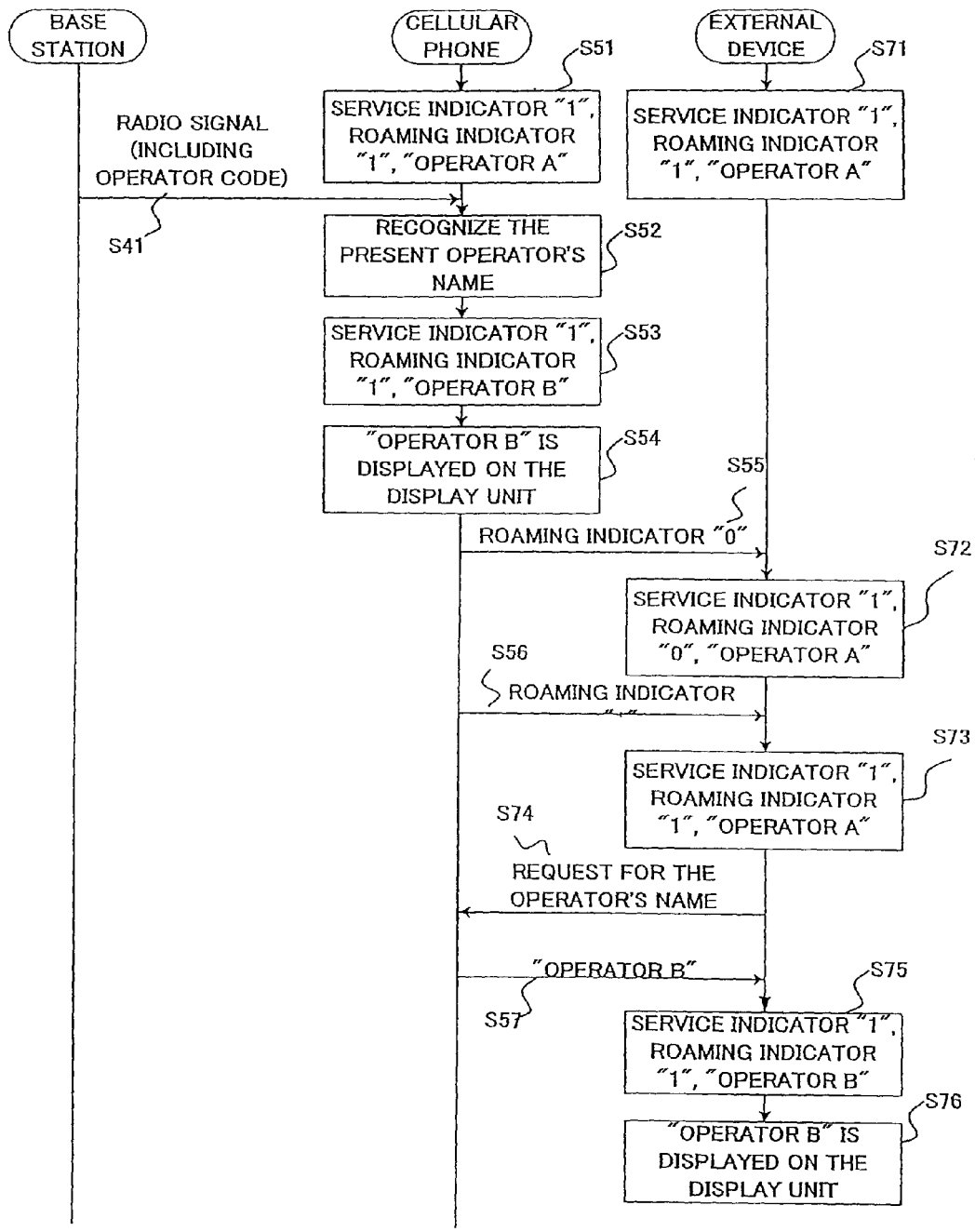
FIG. 5 is a sequence chart for explaining a second case of obtaining an operator's name.

FIG. 5 shows a sequence flowchart executed between the base station, the cellular phone 1, and the external device 2. In FIG. 5, steps S41, S51 through S54, S57, S71, and S74 through S76 correspond to steps S1, S11 through S14, S16, S31, and S33 through S35 in FIG. 5, respectively. Therefore, detailed explanation regarding these steps is omitted.

In step S55, the control unit 41 of the cellular phone 1 first transmits the Roaming-indicator indicating "0" to the external device 2 via the BT module 47, when the control unit 41 detects that the operator's name has changed from "OPERATOR A" to "OPERATOR B" with the Roaming-indicator remaining "1". When the external device 2 receives the Roaming-indicator indicating "0", instep S72, the external device 2 registers that the Service-indicator is "1", the Roaming-indicator is "0", and the operator's name is "OPERATOR A".

Subsequently, in step S56, the control unit 41 transmits the Roaming-indicator indicating "1" to the external device 2 via the BT module 47 so as to turn the value of the Roaming-indicator back to the actual value. When the external device 2 receives the Roaming-indicator indicating "1", in step S73, the external device 2 registers that the Service-indicator is "1", the Roaming-indicator is "1", and the operator's name is "OPERATOR A".

Thereafter, in step S74, the external device 2, in response to the subsequent Roaming-indicator indicating "1", transmits a request for the operator's name to the cellular phone 1 via the BT module of the external device 2, since, in this case, the external device 2 transmits the request for the operator's name only in response to the Roaming-indicator indicating "1".

However, if the external device 2 transmits the request for the operator's name in response to the Roaming-indicator indicating "0" or both the Roaming-indicator indicating "0" and the Roaming-indicator indicating "1", the request of the operator's name designated by step S74 could be transmitted before the Roaming-indicator indicating "1" designated by step S56 is received from the cellular phone 1.

Thus, the external device 2 transmits the request for the operator's name to the cellular phone 1 in response to the change of the value of the Roaming-indicator, e.g. the Roaming-indicator changes from "0" to "1" and vice versa, and the present operator's name can be displayed on the display unit of the external device 2.

Unlike the case shown in FIG. 5, the Service-indicator may be used in place of the Roaming-indicator, which is transmitted to the external device 2 when the control unit 41 detects that the operator's name has changed. In this case, the Service-indicator indicating "0", which indicates that the cellular phone 1 resides outside the communication area, is transmitted from the cellular phone 1 to the external device 2. Subsequently, the cellular phone 1 transmits the Service-indicator indicating "1", which indicates that the cellular phone 1 resides in the communication area, to the external device 2.

Also, the Service-indicator may be used in addition to the Roaming-indicator. In this case, the Roaming-indicator indicating "0" and the Roaming-indicator indicating "1" are transmitted to the external device 2 in series. Subsequently, the Service-indicator indicating "0" which indicates that the cellular phone 1 resides outside of the communication area and the Service-indicator indicating "1" which indicates that the cellular phone 1 resides in the communication area are transmitted to the external device 2 in series. Therefore, when the external device 2 does not transmit a request for the operator's name in response to the Roaming-indicator, the external device 2 can still transmit the request for the operator's name to the cellular phone 1 and obtains the present operator's name without failure in response to receipt of the Service-indicator.

Figure 6A:
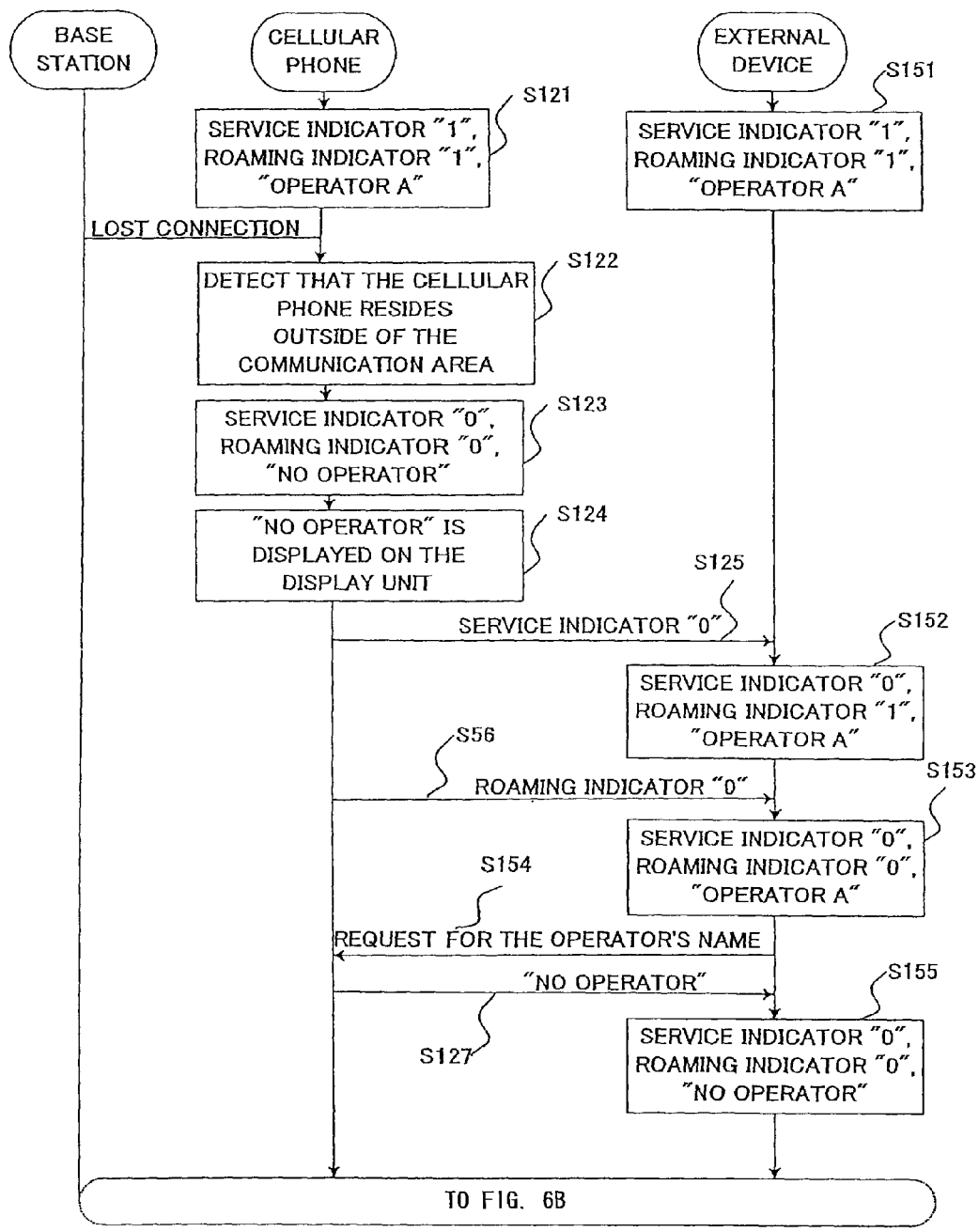
FIGS. 6A to 6C are a sequence chart for explaining a third case of obtaining an operator's name.
Figure 6B:
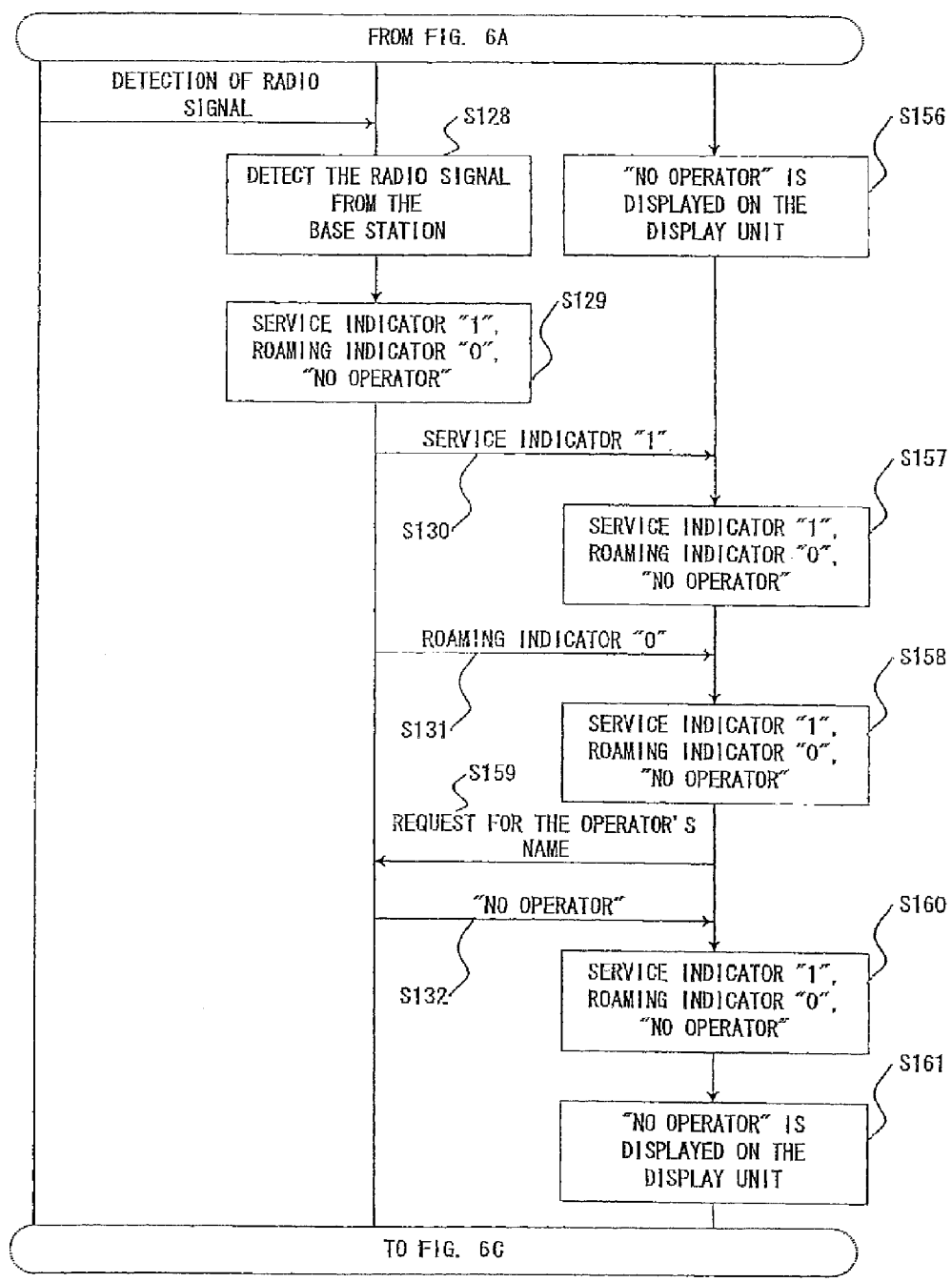
Figure 6C:
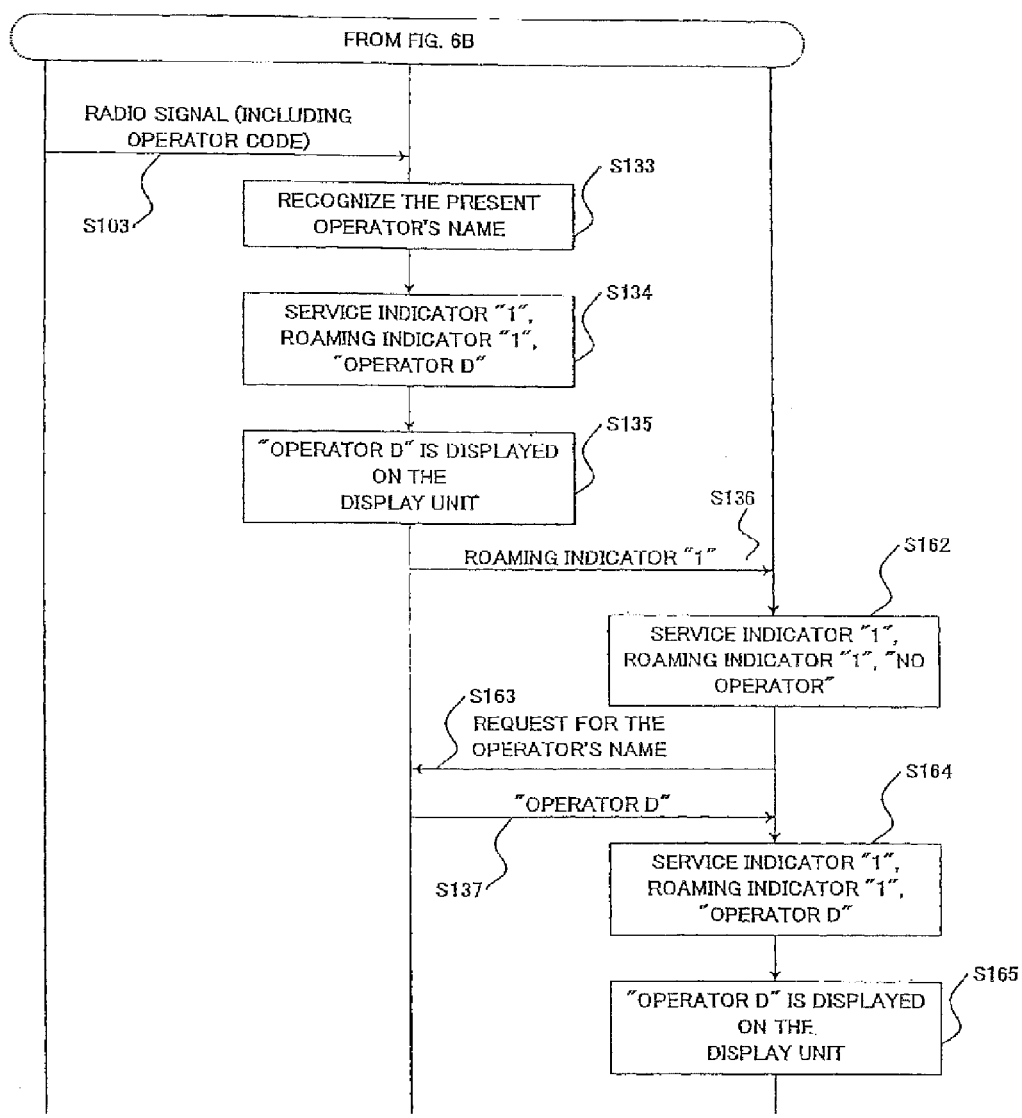

Next, with reference to FIGS. 6A and 6B, an explanation on how the external device 2 obtains the present operator's name will be provided when the cellular phone 1 moves from a roaming area to outside of the communication area, and thereafter returns to the roaming area. FIGS. 6A and 6B show a sequence flowchart executed between the base station, the cellular phone 1, and the external device 2.

First, when the cellular phone 1 resides in the roaming area, both the control unit 41 of the cellular phone 1 and the external device 2 registers that the Service-indicator is "1", the Roaming-indicator is "1", and the operator's name is "OPERATOR A" in steps S121 and S151.

If the cellular phone 1 moves from the roaming area to an area outside of the communication area, the condition of the cellular phone 1 changes from "in service" to "no service". For example, the control unit 41 detects that the cellular phone 1 resides in the area outside of the communication area when the radio signal level, such as an RSSI, decreases under a predetermined level and loses a connection to the base station.

When the control unit 41 detects that the phone's condition has become "no service", in step S122, the control unit 41 registers that the Service-indicator is "0", the Roaming-indicator is "1", and the operator's name is "no operator", thus "no operator" is stored in the RAM in the control unit 41.

Thereafter, under the control of the control unit 41, "no operator" is displayed on the display unit 17 of the cellular phone 1 in step S124.

And in step S125, the control unit 41 transmits the Service-indicator indicating "0" to the external device 2 via the BT module 47. Then, the external device 2 registers that the Service-indicator is "0", the Roaming-indicator is "1", and the operator's name is "OPERATOR A" by receiving the Service-indicator indicating "0" from the cellular phone 1 in step S152.

Subsequently, in step S126, the control unit 41 transmits the Roaming-indicator indicating "0" to the external device 2 via the BT module 47. Then the external device 2 registers that the Service-indicator is "0", the Roaming-indicator is "0", and the operator's name is "OPERATOR A" in step S153.

In step S154, the external device 2 transmits the request for the operator's name to the cellular phone 1 in response to the Roaming-indicator or the Service-indicator.

When the control unit 41, via the BT module 47, receives the request from the external device 2, the control unit 41 reads out the present operator's name, "no operator" , from the RAM and transmits the "no operator" to the external device 2 via the BT module 47 in step S127. When the external device 2 receives the operator's name, "no operator", from the cellular phone 1 via the BT module of the external device 2, the external device 2 registers that the Service-indicator is "0", the Roaming-indicator is "0", and the operator's name is "no operator" in step S155. Thereafter, in step S156, the "no operator" is displayed on the display unit of the external device 2.

Thus, even if the condition of the cellular phone 1 changes to no service, the cellular phone 1 is able to transmit the correct operator's name to the external device 2.

Thereafter, when the cellular phone 1 moves back into the roaming area, the control unit 41 detects that the cellular phone 1 resides in the roaming area by detecting a radio signal from the base station in step S128. Then, the control unit 41 of the cellular phone 1 registers that the Service-indicator is "1", the Roaming-indicator is "0", and the operator's name is "no operator" in step S129. At this time, it is assumed that the control unit 41 does not detect the operator's name from the radio signal, since it takes a few seconds to get the operator's name after the cellular phone 1 receives the radio signal from the base station. Subsequently, the control unit 41 transmits the operator's name, "no operator", to the external device 2 via the BT module 47 in step S130. When the external device 2 receives the operator's name, "no operator", from the cellular phone 1, the external device 2 registers that the Service-indicator is "1", the Roaming-indicator is "0", and the operator's name is "no operator" in step S157.

Subsequently, the control unit 41 transmits the Roaming-indicator "0" to the external device 2 via the BT module 47 in step S131. Then the external device 2 registers that the Service-indicator is "1", the Roaming-indicator is "0" , and the operator's name is "no operator" by receiving the Roaming-indicator indicating "0" from the cellular phone 1, in step S158.

In step S159, the external device 2 transmits a request for the operator's name to the cellular phone 1 via the BT module of the external device 2, in response to the Roaming-indicator or the Service-indicator from the cellular phone 1. When the cellular phone 1 receives the request for the operator's name from the external device 2 via the BT module 47, the control unit 41 reads out the operator's name, "no operator", from the RAM and transmits the operator's name, "no operator", to the external device via the BT module 47 in step S132. Then, the external device 2 registers that the Service-indicator is "1", the Roaming-indicator is "0", and the operator's name is "no operator" by receiving the operator's name, "no operator", from the cellular phone 1 via the BT module of the external device 2 in step S160. Further the operator's name is displayed on the display unit of the external device 2 in step S161.

Subsequently, when the control unit 41 of the cellular phone 1 detects the operator's name, "OPERATOR D", from the radio signal in step S133, the control unit 41 registers that the Service-indicator is "1", the Roaming-indicator is "1", and the operator's name is "OPERATOR D", storing the operator's name, "OPERATOR D" , in the RAM of the control unit 41 in step S134. Thereafter, under the control of the control unit 41, the present operator's name is displayed on the display unit 17 of the cellular phone 1 in step S135.

In step S163, in response to the reception of the Roaming-indicator from the cellular phone 1, the external device 2 transmits a request for an operator's name to the cellular phone 1 via the BT module 47. When the control unit 41 of the cellular phone 1 receives the request from the external device 2 via the BT module 47, in step S137, the control unit 41 reads out the operator's name, "OPERATOR D", from the RAM and transmits the operator's name, "OPERATOR D", to the external device 2 via the BT module 47. Thereafter, when the external device 2 receives the operator's name, "OPERATOR D", from the cellular phone 1 via the BT module 47 of the external device 2, in step S164, the external device 2 registers that the Service-indicator is "1", the Roaming-indicator is "1", and the operator's name is "OPERATOR D". Further the operator's name, "OPERATOR D" is displayed on the display unit of the external device 2 in step S165.

Thus, even when the cellular phone 1 returns back to the communication service area and an operator's name is not detected, a contingent operator's name is prevented from being displaying on the display unit of the external device 2. Furthermore, since the cellular phone 1 transmits the Roaming-indicator to the external device 2 when the cellular phone 1 detects the operator's name from the radio signal, the external device can take steps to obtain the operator's name from the cellular phone 1 in a timely fashion.

In FIGS. 6A and 6B, the embodiment is described based on an assumption that the cellular phone 1 moves between a roaming area and an area outside of the communication area, however, the process described above may be applied to a condition wherein the cellular phone 1 moves between a home area and an area outside of a communication area. In this case, the Roaming-indicator indicating "1" in steps S121, S133, S134, S136, S151, S152, S162, and S164 is replaced by the Roaming-indicator indicating "0".

In the above description, the cellular phone 1 is used to explain the embodiment. However, this invention can be applied to a PHS (Personal Handyphone system), a PDA (personal Digital Assistance), a small TV device, a digital camera, a video camera, a portable audio device, a portable video camera, and other devices having a display unit.

The cellular phone 1, or any of the other devices referred to supra, performs a portion or all of the processing steps of the above-noted embodiments in response to the control unit 41 (and its CPU and associated control units) executing one or more sequences of one or more instructions contained in a memory, such as the memory unit 42. Such instructions may be read into the memory unit 42 from another computer readable medium, such as a hard disk or a removable media drive. One or more processors in a multi-processing arrangement may also be employed to execute the sequences of instructions contained in the memory unit 42. In alternative embodiments, hard-wired circuitry may be used in place of or in combination with software instructions. Thus, embodiments are not limited to any specific combination of hardware circuitry and software.

As stated above, the cellular phone 1 includes at least one computer readable medium or memory for holding instructions programmed according to the teachings of the above-noted embodiments and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

What is claimed is:

1. A mobile communication apparatus, comprising:
   a first radio interface configured to communicate with a base station;
   a second radio interface configured to communicate with an external device via a short-range wireless link;
   a memory configured to store roaming status information, service status information, and operator information; and
   a controller configured to control the mobile communication apparatus,
   wherein the controller detects one of a plurality of events including a change of operator information, moving to an area outside of a communication area, and moving back into a roaming area,
   wherein when the controller detects one of the events, the controller obtains operator information based on a radio signal from the base station, compares the obtained operator information with the stored operator information in the memory, and transmits the roaming status information and the service status information in the memory to the external device when it is detected that the obtained operator information has changed, even in a case that the roaming status information indicating the roaming area remains unchanged.

2. The mobile communication apparatus according to claim 1, wherein the controller transmits the one of the roaming status information and the service status information in the memory to the external device after one of opposite roaming status information to the roaming status information in the memory and opposite service status information to the service status information in the memory to the external device.

3. The mobile communication apparatus according to claim 1, wherein the controller transmits the obtained operator information to the external device via the second radio interface when a request for the operator information is received in response to the one of the roaming status information and the service status information in the memory.

4. A mobile communication apparatus, comprising:
   a first radio interface configured to communicate with a base station;
   a second radio interface configured to communicate with an external device via a short-range wireless link;
   a memory configured to store first roaming status information, first service status information, and first operator information; and
   a controller configured to control the mobile communication apparatus,
   wherein, the controller checks whether the mobile communication apparatus resides in a communication area, when the controller determines that the mobile communication apparatus is outside the communication area and changes from the first service status information to a second service status information, the controller sends a second roaming status information and the second service status information to the external device, and receives a request for operator information from the external device in response to the second roaming status information or the second service status information which are sent to the external device, and rewrites the first operator information, the first roaming status information, and the first service status information with a no operator status, a second roaming status information, and a second service status information, respectively.

5. The mobile communication apparatus according to claim 4, wherein the second roaming status information is the opposite status to the first roaming status information and the second service status information is the opposite status to the first service status information.

6. The mobile communication apparatus according to claim 4, wherein the controller transmits the no operator status to the external device via the second radio interface when a request for the operator information is received in response to the second roaming status information and the second service status information.

7. A mobile communication apparatus, comprising:
   a first radio interface configured to communicate with a base station;
   a second radio interface configured to communicate with an external device via a short-range wireless link;
   a memory configured to store first roaming status information, first service status information, and first operator information; and
   a controller configured to control the mobile communication apparatus,
   wherein, after the controller determines that the mobile communication apparatus has left a communication area, the controller checks whether the mobile communication apparatus moves back into the communication area, the mobile communication apparatus sends the first roaming status information indicating the same value before the mobile communication apparatus moves back into the communication area and a second service status information to the external device, receives a request for operator information from the external device in response to the first roaming status information and second service status information, and rewrites the first operator information and the first service status information with a no operator status and a second service status information, respectively.

8. The mobile communication apparatus according to claim 7, wherein the second service status information is the opposite status to the first service status information.

9. The mobile communication apparatus according to claim 7, wherein the controller transmits the no operator status to the external device via the second radio interface when a request for the operator information is received in response to the first roaming status information and the second service status information.

10. A mobile communication apparatus, comprising:
    a first radio interface configured to communicate with a base station;
    a second radio interface configured to communicate with an external device via a short-range wireless link;
    a memory configured to store roaming status information, service status information, and operator information;
    means for detecting one of a plurality of events including a change of operator information, moving to an area outside of a communication area of the mobile communication system, and moving back into a roaming area of the mobile communication apparatus;

means for obtaining operator information based on a radio signal from the base station in response to the detection of one of the events;

means for comparing the obtained operator information with the operator information in the memory;

means for transmitting one of the roaming status information and the service status information in the memory to the external device when it is detected that the operator information has changed, even in a case that the roaming status information indicating the roaming area remains unchanged.

11. The mobile communication apparatus according to claim 10, wherein transmitting means transmits one of opposite roaming status information to the roaming status information in the memory and opposite service status information to the service status information in the memory before transmitting the one of the roaming status information and the service status information in the memory to the external device.

12. The mobile communication apparatus according to claim 10, further comprising:

means for transmitting the second operator information to the external device via the second radio interface when a request for the operator information is received in response to the one of the first roaming status information and the first service status information.

13. A mobile communication system, comprising:

a base station;

a radio interface configured to communicate with an external device via a short-range wireless link;

a memory configured to store first roaming status information, first service status information, and first operator information;

means for checking whether the mobile communication system resides in a communication area;

means for rewriting the first operator information, the first roaming status information, and the first service status information with a no operator status, a second roaming status information, and a second service status information, respectively, when the controller determines that the mobile communication system is outside the communication area and changes from the first service status information to the second service status information, the controller sends a second roaming status information and the second service status information to the external device, and receives a request for operator information from the external device in response to the second roaming status information or the second service status information which are sent to the external device; and means for transmitting the second roaming status information and the second service status information to the external device.

14. The mobile communication system according to claim 13, wherein the second roaming status information is the opposite status to the first roaming status information and the second service status information is the opposite status to the first service status information.

15. The mobile communication system according to claim 13, further comprising:

means for transmitting the second operator information to the external device via the radio interface when a request for the operator information is received in response to the second roaming status information and the second service status information.

16. A mobile communication system, comprising:

a base station;

a radio interface configured to communicate with an external device via a short-range wireless link;

a memory configured to store first roaming status information, first service status information, and first operator information;

means for checking whether the mobile communication system resides in a communication area;

means for sending the first roaming status information indicating the same value before the mobile communication apparatus moves back into the communication area and a second service status information to the external device after the controller determines that the mobile communication system has left a communication area, and receiving a request for operator information from the external device in response to the first roaming status information and second service status information , means for rewriting the first operator information and the first service status information with a no operator status and the second service status information, respectively.

17. The mobile communication system according to claim 16, wherein the second service status information is the opposite status to the first service status information.

18. The mobile communication system according to claim 16, further comprising:

means for transmitting the second operator information to the external device via the radio interface when a request for the operator information is received in response to the first roaming status information and the second service status information.

* * * * *